United States Patent
Koepele et al.

(10) Patent No.: US 11,688,904 B2
(45) Date of Patent: Jun. 27, 2023

(54) ELECTRIC POWERTRAIN SYSTEM WITH MULTI-MODULE BATTERY PACK AND INTERMODULE THERMAL BARRIER

(71) Applicant: GM GLOBAL TECHNOLOGY OPERATIONS LLC, Detroit, MI (US)

(72) Inventors: Cara A. Koepele, Royal Oak, MI (US); Su Jung Han, West Bloomfield, MI (US); Raviraj U. Nayak, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 177 days.

(21) Appl. No.: 17/228,877

(22) Filed: Apr. 13, 2021

(65) Prior Publication Data

US 2022/0328900 A1    Oct. 13, 2022

(51) Int. Cl.
| | |
|---|---|
| *H01M 10/658* | (2014.01) |
| *H01M 50/204* | (2021.01) |
| *H01M 10/613* | (2014.01) |
| *H01M 10/625* | (2014.01) |
| *B60K 1/04* | (2019.01) |

(52) U.S. Cl.
CPC ............ *H01M 10/658* (2015.04); *B60K 1/04* (2013.01); *H01M 10/613* (2015.04); *H01M 10/625* (2015.04); *H01M 50/204* (2021.01); *B60K 2001/0416* (2013.01); *H01M 2220/20* (2013.01)

(58) Field of Classification Search
CPC ............ H01M 10/658; H01M 10/613; H01M 10/625; H01M 50/204; H01M 50/22; H01M 50/222; H01M 50/209; H01M 50/207; H01M 50/242; H01M 50/244; H01M 50/233
See application file for complete search history.

(56) References Cited

U.S. PATENT DOCUMENTS

| | | | |
|---|---|---|---|
| 2004/0191542 A1* | 9/2004 | McLeod | B60R 13/0869 428/137 |
| 2016/0226112 A1* | 8/2016 | Maskew | B60L 3/0084 |
| 2021/0074960 A1* | 3/2021 | Stude | H01M 50/124 |

FOREIGN PATENT DOCUMENTS

| | | | | |
|---|---|---|---|---|
| CN | 110120482 A | * | 8/2019 | .......... H01M 10/613 |
| JP | 5541100 B2 | * | 7/2014 | ............ H01M 50/20 |
| WO | WO-2020214383 A1 | * | 10/2020 | ............ H01M 50/20 |
| WO | WO-2020262081 A1 | * | 12/2020 | ............. B60L 50/64 |

* cited by examiner

*Primary Examiner* — Christopher P Domone
*Assistant Examiner* — Jonathan William Estes
(74) *Attorney, Agent, or Firm* — Quinn IP Law

(57) ABSTRACT

A multi-module battery pack includes a battery tray defining multiple battery tray compartments, battery modules each disposed within a corresponding one of the compartments, and a thermal barrier arranged in a predefined heat transfer path through the tray between an adjacent pair of the battery modules. The thermal barrier has a thickness of at least about 1 mm and a thermal conductivity of less than about 4 W/m-K, such that the thermal barrier blocks the heat transfer path to mitigate a thermal runaway event of one of the adjacent pair of battery modules. An electric powertrain system includes a rotary electric machine having phase leads and an output member, a driven load coupled to the output member, and the multi-module battery pack. A method includes providing the tray, identifying the heat transfer path, and arranging the thermal barrier in the heat transfer path.

20 Claims, 5 Drawing Sheets

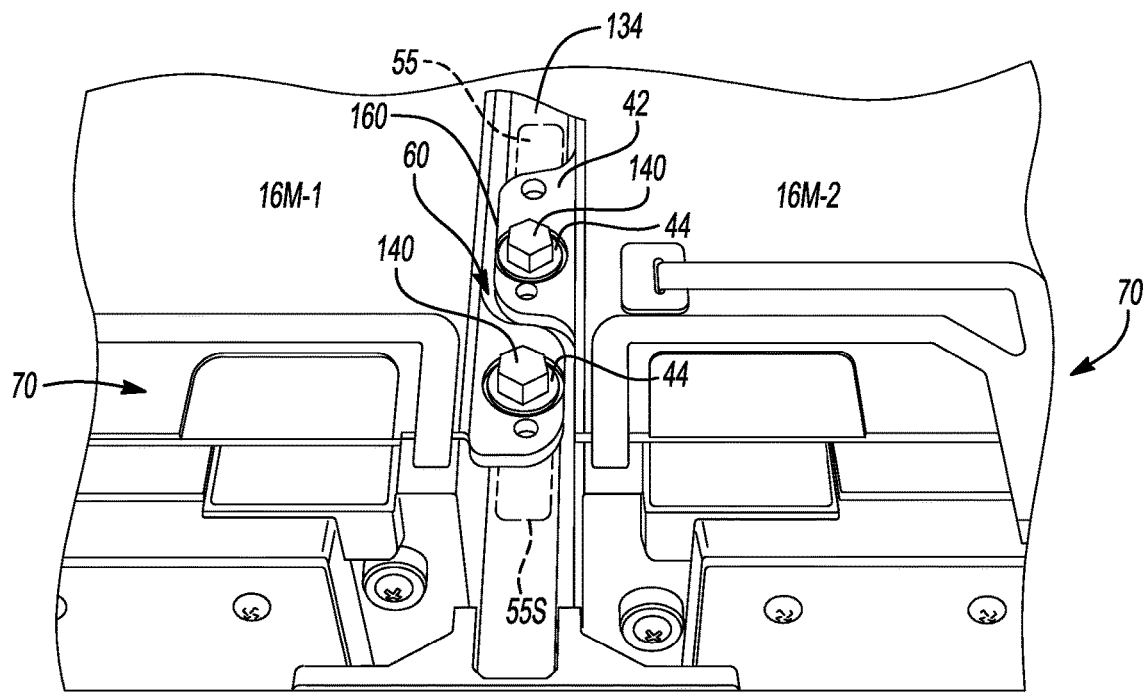
Fig-5
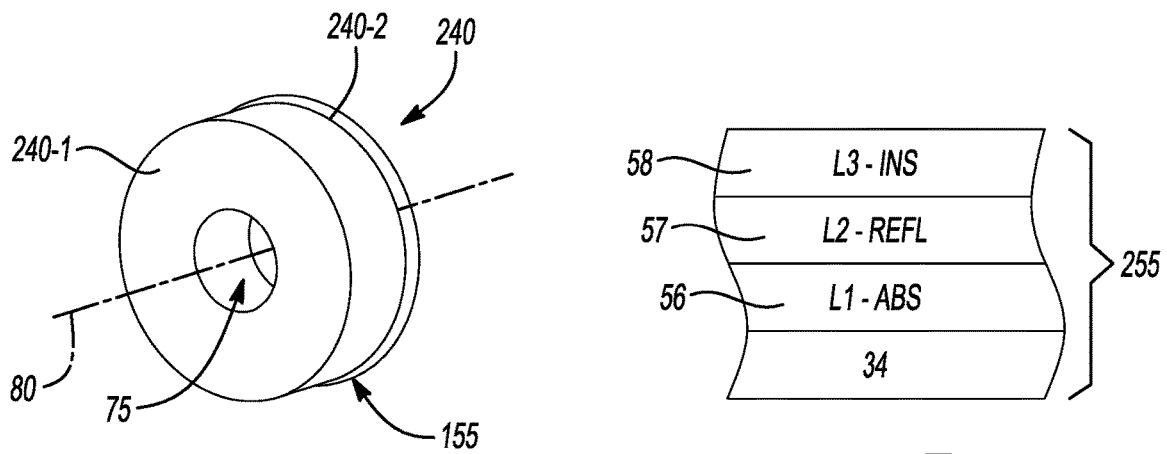
Fig-6
Fig-7

ELECTRIC POWERTRAIN SYSTEM WITH MULTI-MODULE BATTERY PACK AND INTERMODULE THERMAL BARRIER

INTRODUCTION

High-voltage electrical systems are commonly used to energize onboard functions of various mobile and stationary systems. In a motor vehicle, for instance, a rechargeable energy storage system (RESS) typically includes a high-voltage battery pack constructed from an application-suitable number of interconnected battery modules. Electrode extensions of constituent electrochemical battery cells within each of the battery modules are conductively joined to construct the battery pack. The battery pack is configured to provide a direct current (DC) output voltage at a level suitable for powering a coupled electrical and/or mechanical load, with the DC output voltage determined by the number and electrochemical composition of the battery cells, the particular series or parallel connections used to interconnect the battery modules, and other design factors.

In motor vehicle applications in particular, i.e., applications in which the above-noted coupled load includes one or more driven road wheels, evolving battery technologies have enabled construction of low-profile multi-module battery packs having high power densities. For example, modern battery electric vehicles benefit from flatter, lighter weight battery packs in which the individual battery modules are supported within a planar battery tray situated below a plane of the vehicle's floor pan. The construction and positioning of such battery packs frees up valuable passenger and cargo space within the vehicle interior that would otherwise be occupied by the battery pack and other power electronic components of the RESS.

SUMMARY

Disclosed herein is a multi-module battery pack of the type generally described above, an electric powertrain system and a motor vehicle employing the same, and a method for constructing the battery pack in a manner that mitigates certain thermal runaway conditions. In its various embodiments, the battery pack includes a thermal barrier arranged in or along one or more predefined heat transfer paths between adjacent battery modules. Different alternative or cooperative embodiments for implementing the thermal barrier include the use of flat adhesive strips of thermal insulation material, spray coatings, fastener/washer backings, and the like, with possible multi-layer composite embodiments also described herein.

As appreciated in the art, thermal runaway is particular thermodynamic condition or event in which a cell temperature of a given battery cell reaches a threshold temperature, above which the cell temperature will continue to rise of its own self-sustaining accord faster than the cell temperature can be regulated, e.g., by an onboard cooling system. Above a certain temperature, battery electrodes tend to decompose exothermically as the battery cell's active materials, e.g., lithium in a typical lithium-based batter, react with surrounding electrolyte materials within the battery cell. At higher temperatures, the electrolyte materials themselves may experience an exothermic reaction, thereby further elevating the cell temperature.

Should thermal runaway occur within a battery cell located in close proximity to another battery cell, resulting heat may quickly spread to the adjoining battery cell in an exothermic chain reaction. Likewise, the close proximity of adjacent battery modules in a multi-module battery pack predisposes the battery pack to a higher risk of intermodular thermal runaway as heat quickly propagates from one battery module to another. The present solutions are therefore intended to isolate a thermal runaway event within a given battery module by interposing thermally insulating materials, i.e., the above-noted thermal barrier, at strategic locations of the multi-module battery pack in accordance with the present disclosure.

According to an exemplary embodiment, the multi-module battery pack described herein includes a battery tray, a plurality of battery modules, and the thermal barrier. The battery tray defines multiple battery tray compartments. Each respective battery module is disposed within a corresponding battery tray compartment. With respect to the thermal barrier, this component is arranged in one or more heat transfer paths that exist through the battery tray, i.e., between an adjacent pair of the battery modules. The thermal barrier as contemplated herein has, in this particular embodiment, a thickness of at least about 1 millimeter (mm) and a thermal conductivity of less than about 4 watts per meter Kelvin (W/m-K). The thermal barrier is thus configured to block the heat transfer path(s) and thereby mitigate a thermal runaway event of one of the adjacent pair of the battery modules.

The battery tray may include transverse inner walls arranged orthogonally with respect to longitudinal outer walls of the battery tray to define the multiple battery tray compartments, e.g., as an approximate grid of rectangular battery tray compartments. In such an embodiment, the predefined heat transfer path includes a surface of the transverse inner walls.

Each respective battery module may include module tabs connected via fasteners to a respective one of the transverse inner walls. In this particular configuration, the predefined heat transfer path passes through the module tabs and fasteners connected thereto. In some implementations, each fastener may respectively include a flat/planar annular washer disposed on one of the transverse inner walls. The thermal barrier in this instance may be arranged between the washer and the transverse inner walls.

The thermal barrier in a possible implementation may coat the washer or a surface thereof, and/or may be integrally formed therewith.

The thermal barrier in some embodiments is configured as an elongated strip adhered or otherwise attached to the transverse inner walls in proximity to the above-noted washer. The elongated strip may define notches, with the notches in turn configured to receive a threaded fastener therein.

In a possible configuration, the thermal barrier may include a refractory ceramic material having a thermal conductivity of less than about 4 W/m-K.

The battery tray may be constructed from aluminum in a non-limiting exemplary embodiment, or another application-suitable thermally conductive material.

The thermal barrier in a multi-layer embodiment may be constructed to include a heat-absorbing/phase transition layer adhered to a surface of the battery pack, a heat-reflecting layer adhered to the heat-absorbing/phase transition layer, and a thermally-insulating layer adhered to the heat-absorbing/phase transition layer.

The thermal barrier in an alternative embodiment is formed from a composite thermal spray coating applied to one or more surfaces of the battery tray.

Also disclosed herein is a method for mitigating a thermal runaway event in a multi-module battery pack of the type described above. The method according to an exemplary embodiment includes providing a battery tray having multiple battery tray compartments, and configured to support a plurality of battery modules arranged thereon. When arranged in this manner, a respective one of the battery modules is disposed within a corresponding battery tray compartment. Additionally, the method includes identifying a heat transfer path, i.e., one or more such paths, through the battery tray between an adjacent pair of the battery modules. The method also includes arranging a thermal barrier in the identified heat transfer path(s) between the adjacent pair of the battery modules, with the thermal barrier having a thickness of at least about 1 mm and a thermal conductivity of less than about 4 W/m-K, such that the thermal barrier blocks the heat transfer path(s).

An electric powertrain system is also disclosed herein. In a representative embodiment, the electric powertrain system includes a rotary electric machine, a driven load, and the above-described multi-module battery pack. The rotary electric machine, e.g., an electric propulsion motor, has phase leads and an output member in a non-limiting alternating current (AC)/polyphase embodiment. The driven load is coupled to the output member of the rotary electric machine and powered thereby. A power inverter in this AC embodiment of the rotary electric machine is connected to the battery pack and to the phase leads. The power inverter is configured to energize the rotary electric machine via the battery pack to thereby cause the rotary electric machine to deliver motor torque to the driven load.

In this particular embodiment of the electric powertrain system, the multi-module battery pack includes the aforementioned battery tray, the battery modules arranged in respective battery tray compartments thereof such that a heat transfer path exists between an adjacent pair of the battery modules through the battery tray, and the thermal barrier described in detail herein. The thermal barrier is adhered or otherwise attached to the battery tray, and has a thermal conductivity of less than about 4 W/m-K, such that the thermal barrier blocks the heat transfer path(s) during a thermal runaway event of one of the adjacent pair of battery modules. In this manner the thermal barrier mitigates the thermal runaway event.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

BRIEF DESCRIPTION OF THE DRAWINGS

FIG. 5 is a partial perspective view illustration of a portion of the battery pack of FIG. 1.

FIG. 6 is a perspective view illustration of an annular washer having the thermal barrier described herein.

FIG. 7 is a schematic illustration of a multi-layer embodiment of the thermal barrier in accordance with an aspect of the disclosure.

Figure 1:
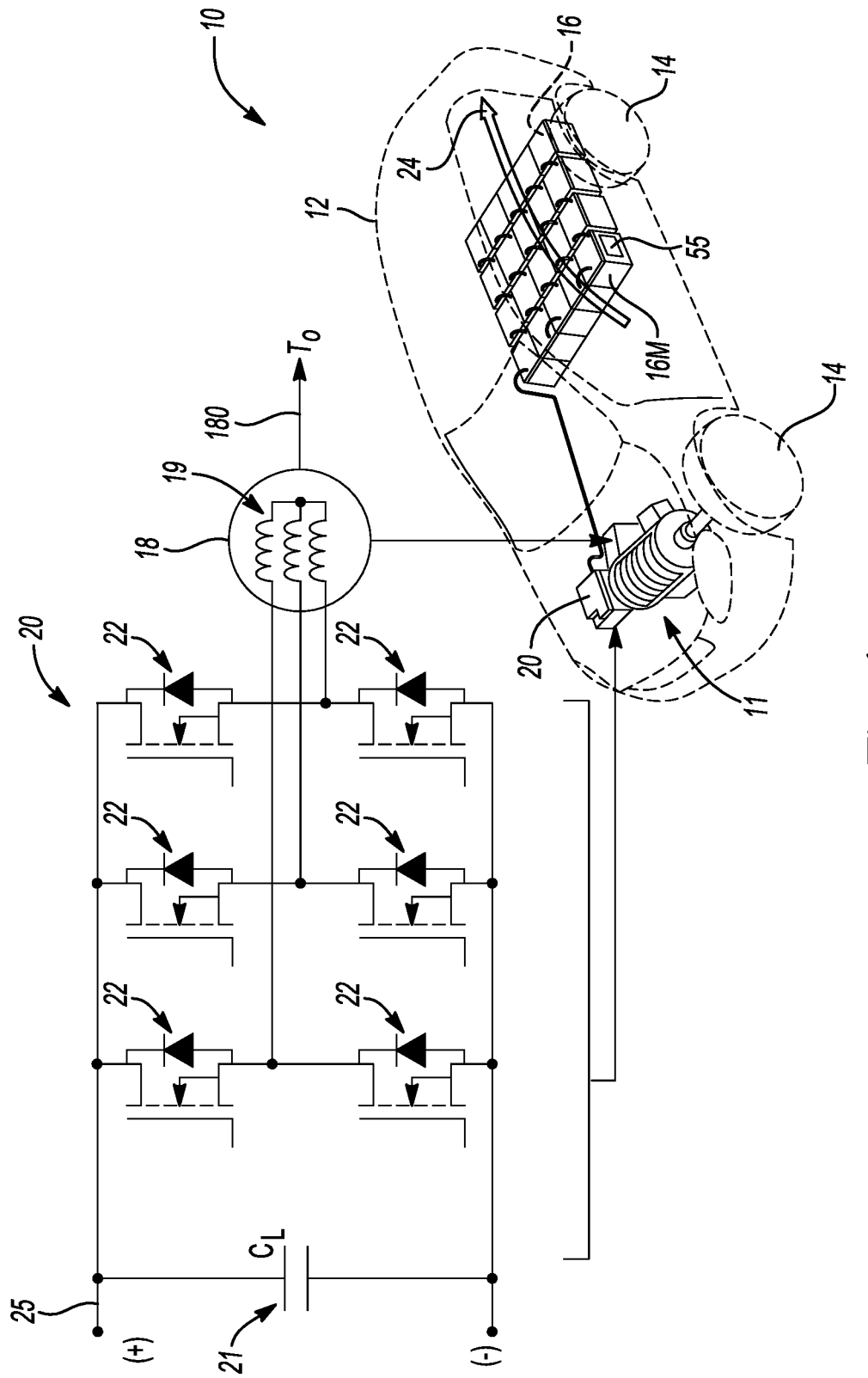
FIG. 1 is a schematic illustration of an exemplary motor vehicle having a multi-module battery pack supported by a planar battery tray, and a thermal barrier configured to block one or more heat transfer paths during a thermal runaway event occurring in a battery module of the battery pack.

Representative embodiments of this disclosure are shown by way of non-limiting example in the various drawings, and are described in additional detail below. Novel aspects of the present disclosure are not limited to the particular forms illustrated in the above-enumerated drawings, however. Rather, the present disclosure is intended to extend to modifications, equivalents, combinations, and alternatives falling within the scope of the disclosure as encompassed, for instance, by the appended claims.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within ±5% of", or "within acceptable manufacturing tolerances", or logical combinations thereof.

Referring to the drawings, wherein like reference numbers refer to like components, FIG. 1 schematically depicts a motor vehicle 10 having an electric powertrain system 11, the latter including a multi-module battery pack 16. As set forth herein, the battery pack 16 is constructed using one or more thermal barriers 55, each of which is arranged in or along one or more predefined heat transfer paths within the battery pack 16. The presence of the thermal barrier(s) 55 is intended to help mitigate intermodular thermal runaway events as described below.

The motor vehicle 10 in the illustrated exemplary configuration includes a vehicle body 12 and a set of road wheels 14, with the latter acting as a driven load. The motor vehicle 10 is depicted in FIG. 1 and described below as a representative battery electric vehicle without limitation. That is, those skilled in the art will appreciate that the present teachings may be applied to advantage in a wide range of electrified systems, such as but not limited to hybrid electric vehicles, propeller-driven rail vehicles or airborne vehicles such as boats, trains, and rotary or fixed wing aircraft, battery powered robots, and various other mobile platforms in which electrical energy is drawn from or stored in constituent electrochemical battery cells (not shown) of the battery pack 16. Likewise, the present teachings may be extended to stationary systems such as power plants, hoists, and conveyor systems in which the electric powertrain system 11 actively powers a driven load other than the illustrated road wheels 14.

In the non-limiting exemplary embodiment of FIG. 1, the electric powertrain system 11 includes a power inverter 20 and a rotary electric machine 18. The power inverter 20, commonly referred to in the art as a traction power inverter module or TPIM, is electrically connected to positive (+) and negative (−) rails of a direct current (DC) voltage bus 25. A DC link capacitor ($C_L$) 21 may be arranged across the positive and negative rails as shown. As part of the power inverter 20, upper and lower semiconductor switches 22, e.g., MOSFETs are shown, or alternatively IGBTs, thyristors, power diodes, or another application-suitable switch configuration having a controlled binary ON/conducting and an OFF/non-conducting state, respectively connect the positive rail (upper semiconductor switches 22) and the negative rail (lower semiconductor switches 22) to stator phase windings 19 of the rotary electric machine 18.

The multi-module battery pack 16 contemplated herein includes a plurality of battery modules 16M. As appreciated in the art, such a multi-cell, multi-module configuration assembles the battery pack 16 from an application-suitable number of the battery modules 16M, with the nominal number and arrangement of FIG. 1 being illustrative of the present teachings and non-limiting. Within a given battery module 16M, individual battery cells are conductively joined together, e.g., via laser welding or ultrasonic welding. The various battery modules 16M in turn are conductively interconnected in a series or parallel arrangement to provide a particular battery output voltage.

During propulsion applications, a DC input voltage from the multi-module battery pack 16 is provided to the power inverter 20 and converted thereby into a polyphase/alternating current (AC) output voltage. The AC output voltage from the power inverter 20 is thereafter used to energize the electric machine 18, which ultimately causes rotation of an output member 180 thereof. The resulting torque (arrow $T_O$) is then transmitted to one or more of the road wheels 14 during a drive mode of the motor vehicle 10, with driven loads other than the road wheels 14 being possible in other embodiments.

As noted generally above, thermal runaway is an undesirable condition or thermodynamic event that can result when a battery cell temperature reaches a threshold temperature above which the battery cell temperature continues to rise. The rise in battery cell temperature occurs faster than the battery cell temperature can be effectively regulated, e.g., using an onboard cooling system (not shown). When a thermal runaway event occurs within a given battery module 16M located in close proximity to an adjacent battery module 16M, e.g., the adjacent pair of battery modules 16M-1 and 16M-2 shown in FIG. 3 as described below, heat from the thermal runaway event may quickly spread between the adjacent battery modules 16M, as schematically represented in FIG. 1 by block arrow 24.

The solutions described below with reference to FIGS. 2-6 are therefore intended to locally isolate and contain thermal runaway to within a particular battery module 16M of the multi-module battery pack 16. This desirable result is achieved herein by interposing thermally insulating materials at or along strategic locations of a battery tray 30 (see FIG. 2) to form the thermal barrier 55 noted above. In this manner, the thermal barrier(s) 55 purposefully block predefined or identified heat transfer paths.

Figure 2:
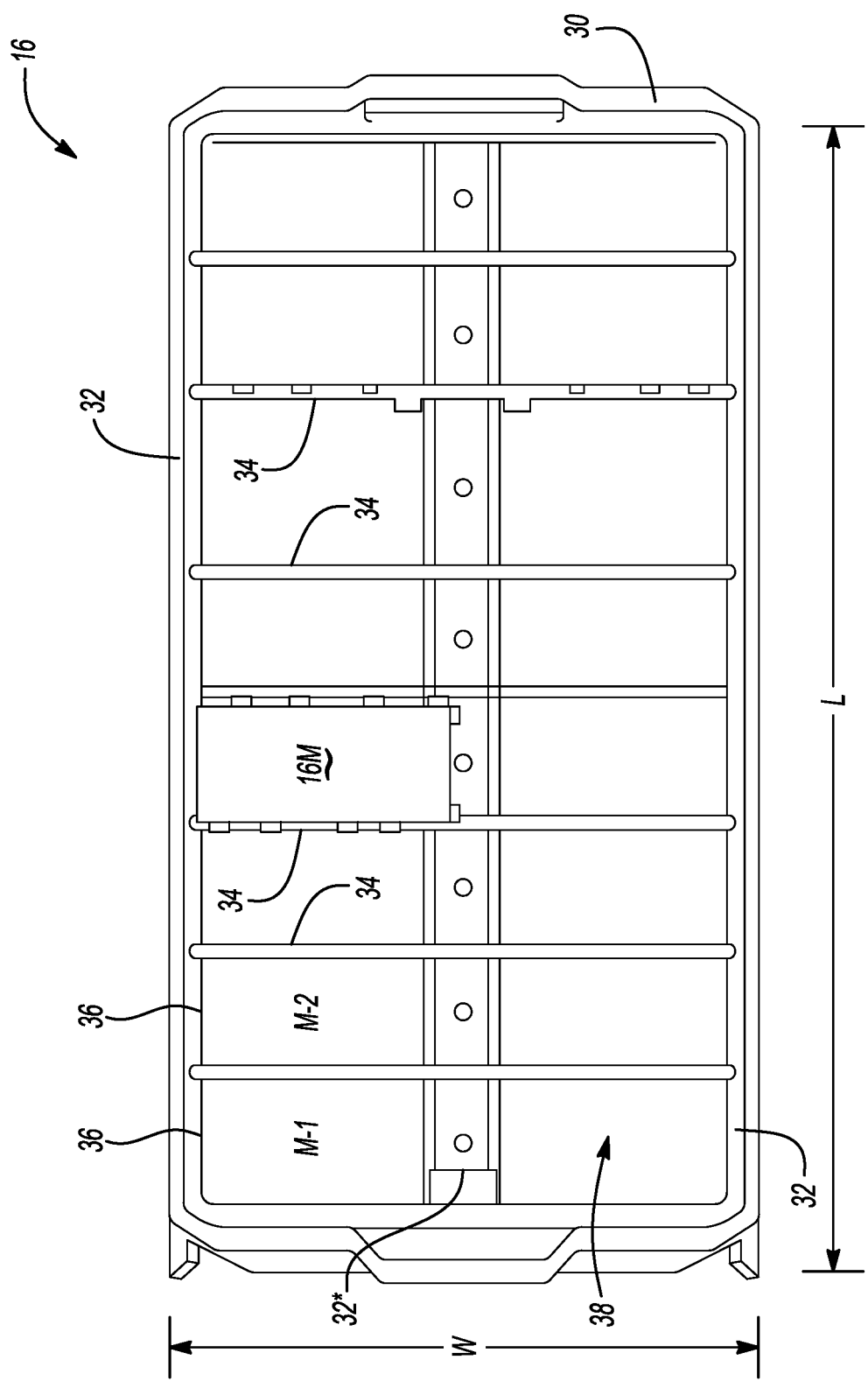
FIG. 2 is a plan view illustration of a representative battery tray and battery module usable as part of the motor vehicle shown in FIG. 1.

Referring to FIG. 2, in a possible embodiment of the multi-module battery pack 16 shown in FIG. 1, shown with an outer housing removed for illustrative clarity and simplicity, individual battery modules 16M are arranged on a battery tray 30 constructed of a thermally conductive material, typically a lightweight and structurally supportive material. As used herein, "thermally conductive" with respect to the battery tray 30 encompasses materials having a thermal conductivity of about 50-100 W/m-K or more at 20-25° C. In an exemplary configuration, for instance, the battery tray 30 is constructed from aluminum, and thus has a thermal conductivity of about 200 W/m-K or more under the above noted 20-25° C. reference conditions.

In the exemplary layout of FIG. 2, similarly constructed battery modules 16M are arranged in a corresponding module area, e.g., M-1 and M-2, extending along a width (W) and length (L) of the battery tray 30. In such an embodiment, the battery tray 30 is configured as a grid formed by longitudinal outer walls 32 extending along the length L of the battery tray 30 and intersected by equally-spaced transverse inner walls 34, with "outer" and "inner" being relative positions of the walls 32 and 34 with respect to each other. In the illustrated embodiment, longitudinal medial wall 32\* forms an approximate centerline of the battery pack 16, but is otherwise constructed to function as one of the longitudinal outer walls 32. The transverse inner walls 34 may correspond to cross-car beams of a rechargeable energy storage system (RESS) in a representative automotive application. The intersecting longitudinal outer walls 32, longitudinal medial wall 32\*, and transverse inner walls 34 thus together define a plurality of battery tray compartments 36, with a given battery module 16M arranged in a corresponding one of the tray compartments 36 each supported from below by a battery tray floor 38 (see FIG. 4).

Figure 3:
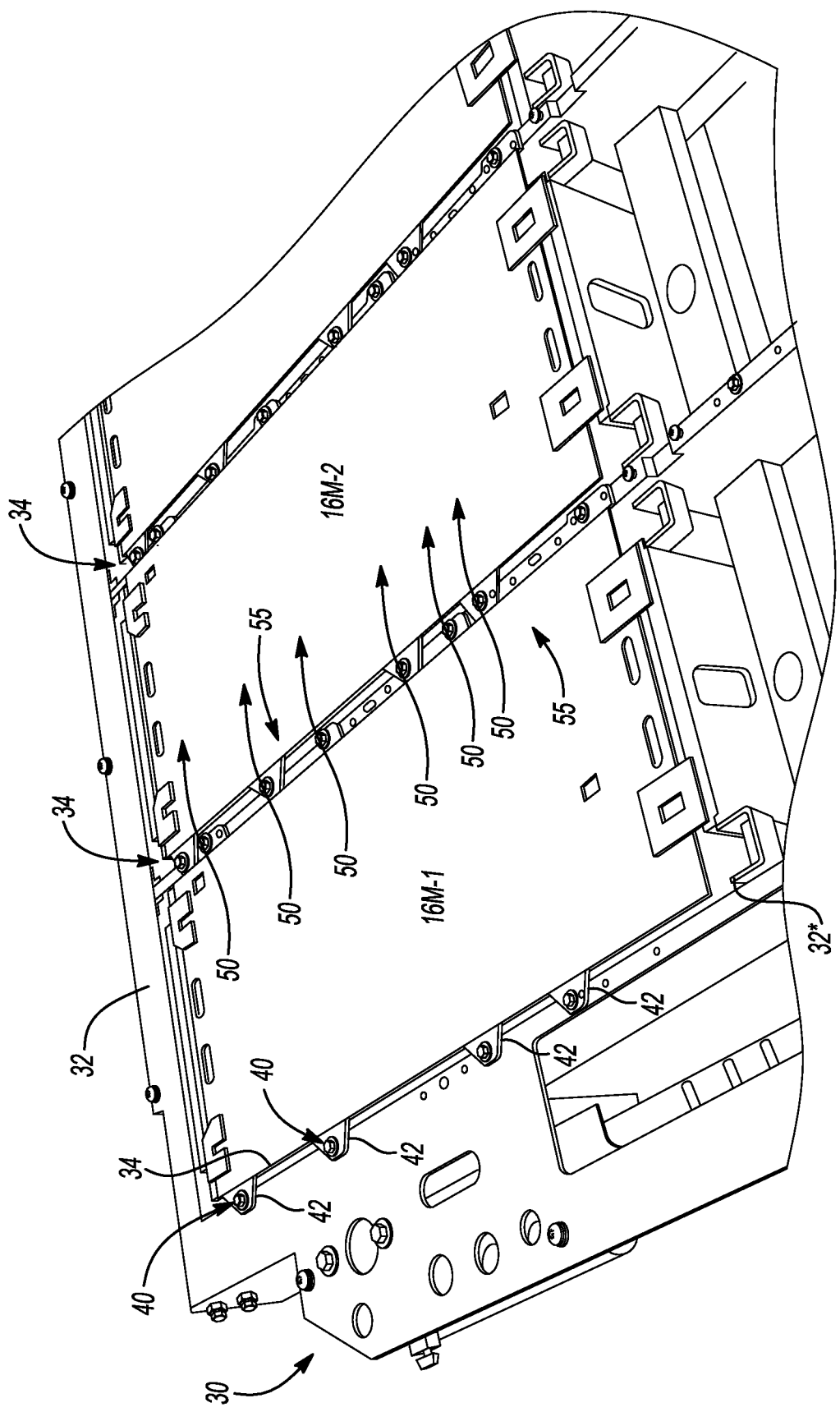
FIG. 3 is a partial perspective view illustration of a portion of the battery pack shown in FIG. 1 depicting adjacent battery modules and heat transfer paths therebetween.

Referring to FIG. 3, due to close adjacent proximity of the battery modules 16M, one or more heat transfer paths (arrows 50) exist through intervening structure of the battery tray 30. For example, the battery module 16M that is labeled 16M-1 in FIG. 3 is situated immediately adjacent to another battery module 16M, with the latter nominally labeled 16M-2. The battery modules 16M-1 and 16M-2 thus form an adjacent pair of the battery modules 16M as used herein. In the event of a thermal runaway event within the battery module 16M-1, for instance, resulting heat emanating from the battery module 16M-1 will tend to propagate along one or more of the heat transfer paths (arrow 50) and into the battery module 16M-2, which absent its own thermal runaway event would, at that moment, be at a lower temperature than that of battery module 16M-1.

Figure 4:
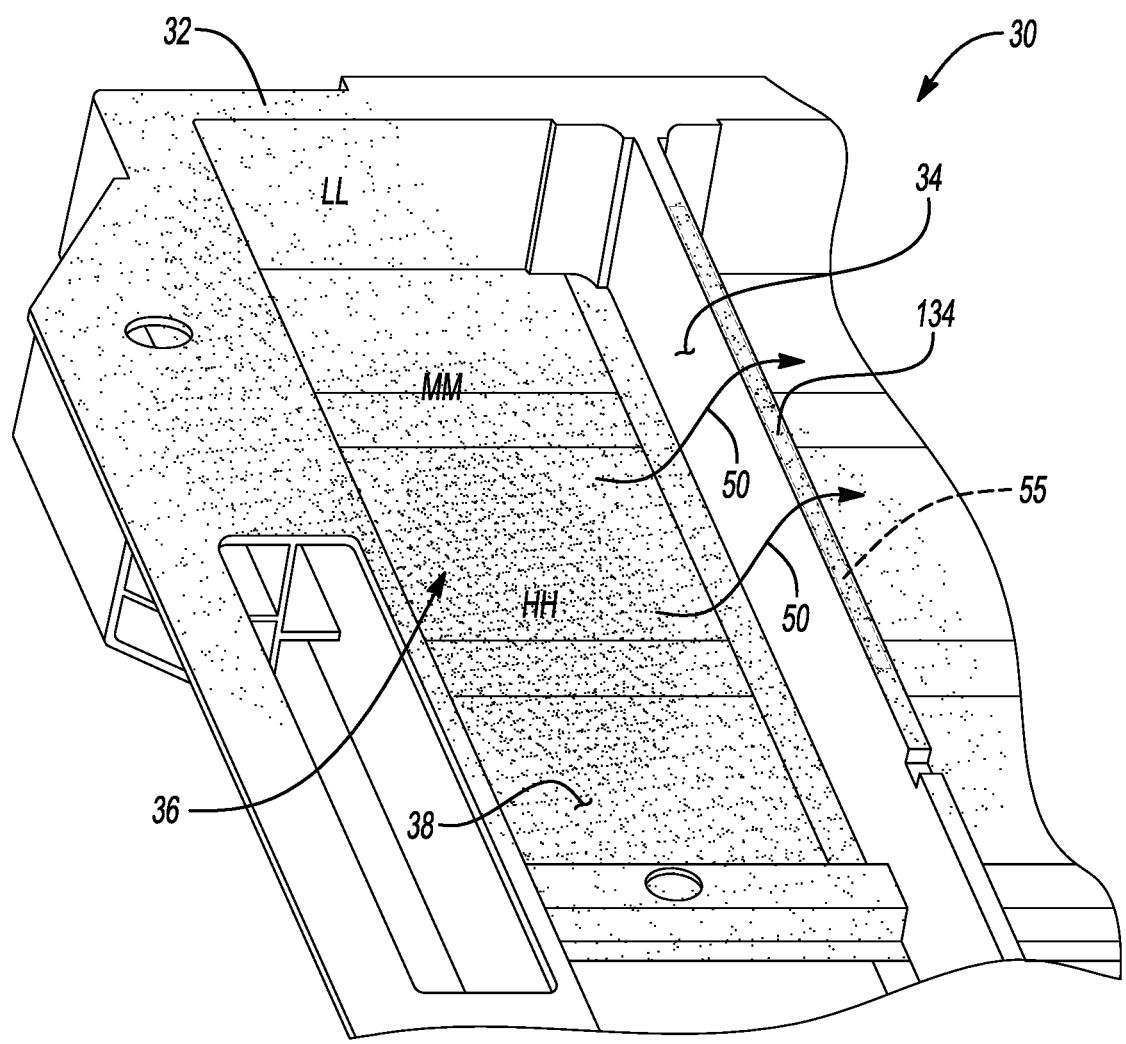
FIG. 4 is a partial perspective view illustration of a battery tray with representative heat concentrations and possible heat transfer paths during a thermal runaway event.

In the illustrated arrangement of FIG. 2, for instance, although the battery modules 16M are spaced a short distance apart from the longitudinal outer wall 32 and the transverse inner walls 34, heat from the battery module 16M-1 will tend to flow into battery module 16M-1 through the intervening conductive structure of the battery module 16M, including the battery module floor 38 shown in FIG. 4, the transverse inner wall 34 arranged between battery modules 16M-1 and 16M-2, and intervening conductive connection hardware.

In some installed configurations, the battery modules 16M may be securely fastened to the battery tray 30 using fasteners 40, e.g., threaded screws or bolts constructed of metal. Each battery module 16M, including the representative battery modules 16M-1 and 16M-2, may include perimeter module tabs 42 to assist in assembling the multi-module battery pack 16. In a possible configuration, the module tabs 42 extend toward a respective one of the transverse inner walls 34 of the battery tray 30. The fasteners 40 are then inserted through openings in the module tabs 42 and tightened into place using a torque wrench or manual tool.

Thus, the heat transfer paths 50 exist between adjacent pairs of the battery modules 16M through the battery tray 30, including the fasteners 40 and the module tabs 42. A thermal runaway event occurring in battery module 16M-1 may therefore spread to the battery module 16M-2 or other adjacent battery modules 16M, and so forth, often quite quickly, thus potentially leading to a pack-wide thermal runaway event. Placement of the thermal barrier 55 within the heat transfer paths 50 as described below is therefore used to mitigate such an event, specifically by isolating thermal runaway to the initiating battery module 16M, or in this example, to battery module 16M-1.

Referring now to FIG. 4, the battery tray 30 described above and depicted in FIG. 2 is shown with the battery modules 16M removed for added clarity. In keeping with the example of FIG. 3, during a thermal runaway event occurring within the confines of the battery module 16M-1, the battery tray floor 38 defining the lower portion of the battery tray compartments 36 will tend to heat up with progression of the exothermic reaction within battery module 16M-1. Although the battery module 16M-1 is physically separated from the transverse inner wall 34 by a small airgap, which itself provides some degree of thermal insulation, the heat transfer paths (arrows 50) extend through the transverse inner wall 34 through the fasteners 40 and the module tabs 42 of FIG. 3. The resulting localized high temperature zones (HH) are indicated via heavier shading in FIG. 4, relative to medium (MM) and low (LL) temperature zones. The thermal barrier 55 in its various embodiments is thus adhered or otherwise attached to the battery tray 30, such as to an upper surface 134 of the transverse inner wall 34 as shown.

Construction and application-suitable placement options for the thermal barrier(s) 55 will now be described in detail with reference to FIGS. 5 and 6. As shown in FIG. 5, with external battery electrical connections 70 shown in a simplified manner, in order to adequately mitigate thermal runaway within the multi-module battery pack 16 of FIG. 1, the thermal barrier 55 may be arranged within one or more of the heat transfer paths (arrow 50) on intervening portion(s) of the battery tray 30. As contemplated herein, the thermal barrier 55 includes one or more materials collectively providing low thermal conductivity in relation to the materials used to construct the battery tray 30. For example, the thermal barrier 55 may have a thermal conductivity of about 4 W/m-K or less in some embodiments, or less than about 2 W/m-K in other embodiments, e.g., when the thermal barrier 55 is constructed of refractory ceramics.

In order to provide sufficient resiliency, the thermal barrier 55 should have a thickness sufficient for withstanding forces imparted during assembly, e.g., when applying torque to the fasteners 40 of FIG. 3 or the alternatively constructed fasteners 140 shown in FIG. 5. A thickness of at least about 1 mm may be sufficient in some implementations, with increased thicknesses beyond this point providing additional structural integrity at the possible expense of weight and material costs. The thermal barrier 55 in its various embodiments is thus configured, due to its unique structure and targeted placement, to substantially or fully block the heat transfer paths (arrows 50) and thus isolate thermal runaway within the multi-module battery pack 16.

As depicted schematically in FIG. 5, the thermal barrier 55 may be embodied as an elongated strip 55S of thermal insulating material, with the elongated strip 55S being adhered or otherwise securely attached to an external surface 134 of the battery tray 30, specifically its transverse inner wall 34, in close proximity to the fasteners 40 or 140 of FIG. 3 or 5, respectively. In the embodiment of FIG. 5, for instance, the fasteners 140 include an annular washer 44, which may be integrally formed with the remaining structure of the fastener 140 or a separate piece as depicted in FIG. 6.

The thermal barrier 55 in the FIG. 5 embodiment may define a set of grooves or notches 60 configured to receive the threaded fasteners 40 therein, i.e., a threaded shaft (not shown) extending into the battery tray 30. Such notches 60 may possibly complement similar notches 160 defined by the module tabs 42, i.e., with a profile, shape, and contour matching that of the notches 160. Use of the notches 60 in lieu of coating the transverse inner wall 34 in its entirety, or integrally forming the washers 44 from the materials used to construct the thermal barrier 55, may have the benefit of reducing assembly costs. Additionally, washers 44 constructed of a relatively low cost metal could be more easily replaced if lost without having to replace the underling thermal barrier 55, which would not be the case when the washers 44 are integrally constructed from or coated with the thermal barrier 55.

The annular washers 44 of FIG. 5 could themselves be considered as an intervening portion of the battery tray 30, being contiguous therewith once properly installed and tightened. In representative embodiments, the thermal barrier 55 may partially or fully coat the washers 44, or the washer 44 could themselves be constructed of the materials of the thermal barrier 55. For example, the individual washers 44 may be constructed at least partially of mica, ceramic, or composite materials and installed under each module tab 42. The heat transfer paths 50 pass directly through the washers 44 and the fasteners 40 disposed therein, or through the alterative fasteners 140. Thus, coating the washer 44 with the thermal barrier 55, an undersurface of the washer 44, or constructing the washer 44 entirely from the materials of the thermal barrier 55, would thus help block the heat transfer paths (arrow 50).

Referring briefly to FIG. 6, the washer 44 of FIG. 5 could be embodied as an annular washer 240 having an upper surface 240-1, a lower surface 240-2, and a center bore or through-hole 75 having a center axis 80. With lower surface 240-2 being immediately adjacent to the battery tray 30 when the washer 240 is installed, e.g., as shown with the washer 44 of FIG. 5, a thermal barrier 155 acting as a first thermal barrier may be adhered or otherwise attached to the lower surface 240-2, alone or in conjunction with the use of the elongated strip 55S of FIG. 5, with the elongated strip 55S thus acting as a second thermal barrier in such an embodiment.

The thermal barrier 55 of FIG. 5 could also be used to coat the transverse inner wall 34 and the upper surface 134 in some embodiments, as opposed to just isolated external surfaces abutting the fasteners 40 or 140 as described above. Various approaches exist for implementing the thermal barrier 55 to significantly delay thermal propagation during a module-to-module/intermodular thermal runaway event. As noted above, one such approach is to construct the thermal barrier 55 as the elongated strip 55S of FIG. 5, which could be applied to the transverse inner walls 34 during assembly of the multi-module battery pack 16.

Alternatively as depicted in FIG. 7, the thermal barrier 55 or 155 could be constructed as a multi-layer barrier 255 having a heat-absorbing/phase transition layer (L1-ABS) 56, a heat-reflecting layer (L2-REFL) 57 adhered or attached to the heat-absorbing/phase transition layer 56, and a thermally-insulating layer (L3-INS) 58 adhered or attached to the heat-reflecting layer 57. With respect to the various layers 56, 57, and 58, the heat-absorbing/phase transition layer 56 could be adhered or attached to a particular portion or surface of the battery tray 30, e.g., the transverse inner walls 34 as shown, and constructed from a heat-shrinkable material and/or a material containing melt/sublimized particles. Such a construction would create a porous microstructure when elevated temperatures are transferred.

The heat-reflecting layer 57 shown schematically in FIG. 7 may contain reflective particles in some embodiments, or layer 57 may be constructed from smooth, polished, or other finished materials to reflect an application-specific amount of incident heat. The thermally-insulating layer 58, i.e., the effective "top coat" of the multi-layer construction of FIG. 7, may be constructed from refractory ceramics, as noted above. Materials having a thermal conductivity of about 4 W/m-K or less could be used, such as alumina, titania, etc., down to those having a thermal conductivity of less than about 2 W/m-K.

In general, materials having the lowest thermal conductivities tend to be the most expensive, and thus a cost-benefit tradeoff exists when selecting application-appropriate materials for implementing the present teachings. Exemplary materials for constructing the thermally-insulating layer 58 include, by way of example and not limitation, Yttria-stabilized zirconia (YSZ) such as $Y_2O_3$—$ZrO_2$, or $Gd_2Zr_2O_7$, $TiO_2$, Spinel, $Al_2O_3$, etc. Such materials and other possible materials should provide sufficient load-bearing capability when torque is applied to the fasteners 40, a property that is facilitated by application to a suitable thickness, e.g., 1 mm or more.

In another possible embodiment, the thermal barrier 55 of FIGS. described above could be applied in a single step as a multi-functional/composite thermal spray coating. For instance, a thermal spray technique of the type appreciated in the art could be used to coat the upper surface 134 (FIG. 4) of the transverse inner wall 34. A mask could possibly be used to create individual/discrete thermal blocking regions underneath the module tabs 42, or the entirety of the transverse inner walls 34 could be coated to a desired thickness.

As thermal spray coating processes introduce porosity to expelled materials, the added porosity has the desirable effect lowering resulting thermal conductivity. Additionally, a roughened surface finish may be provided to the spray coating, e.g., via rolling or texturing. The resulting surface asperities would have the effect of reducing overall contact area with the transverse inner wall 34. Reduced contact area likewise lowers thermal conduction in an assembled state. When refractory ceramics are used, such materials could be used as is, or could be mixed with low melting point polymeric materials.

As will be appreciated by those skilled in the art, the foregoing disclosure lends itself to performance of a related method for mitigating a thermal runaway condition in the multi-module battery pack 16 of FIG. 1. Such a method may include providing the battery tray 30 having the battery tray compartments 36. The battery tray 30 as disclosed above is constructed of a thermally conductive lightweight material such as aluminum. Each one of the battery tray compartments 36 in turn is configured to receive therein and support thereon a respective one of the battery modules 16M, as best shown in FIGS. 2 and 3.

The method in this embodiment includes identifying one or more heat transfer paths, with various heat transfer paths (arrow 50) represented in FIGS. 3 and 4, between the battery modules 16M and through intervening portions of the battery tray 30 and connected hardware, e.g., the fasteners 40. For instance, one may use finite element analysis or a commercially available or custom thermal simulation and analysis/modeling software application to identify the most likely paths for heat propagation under different simulated thermal runaway conditions, or a user may perform a rudimentary analysis of the assembled multi-module battery pack 16 to identify abutting or interconnected surfaces through which heat from one of the battery modules 16M is likely to flow.

After identifying the likely heat transfer paths, the method includes arranging the thermal barrier 55 on one or more intervening portions of the battery tray 30 such that the thermal barrier 55 is configured, i.e., positioned and constructed, to block the heat transfer path(s) during a thermal runaway event. In some embodiments, the method may include arranging a plurality of the battery modules 16M on the battery tray 30, such that the heat transfer paths (arrows 50) are formed between the battery modules 16M through the intervening portion(s) of the battery tray 30 and possibly connecting hardware. Arranging the thermal barrier 55 may include applying refractory ceramics to the battery tray 30 as the thermally-insulating layer 58 shown in FIG. 7, with the refractory ceramics having a thermal conductivity of less than about 4 W/m-K and a thickness of at least about 1 mm in a possible embodiment as noted above.

Arranging the thermal barrier 55 may optionally include spraying the thermal barrier 55 directly onto the battery tray 30. Other embodiments include forming the thermal barrier 55 as a multi-layered elongated strip or an annular washer 44, e.g., as the heat-absorbing/phase transition layer 56, the heat-reflecting layer 57 adjacent to the heat-absorbing/phase transition layer 56, and the thermally-insulating layer 58 adjacent to the heat-absorbing/phase transition layer 57 as shown in FIG. 7. Attaching the multi-layered elongated strip or the washer 44 to the external surface 134 of the battery tray 30 may include securing the washer 44 to the battery tray 30 using the fasteners 40.

As will be appreciated by those of ordinary skill in the art in view of the foregoing teachings, the present solutions provide a significant delay of module-to-module thermal propagation in a host of static or mobile battery applications, including but not limited to the exemplary vehicular application depicted in FIG. 1 and described herein. Different implementations may be used depending on the end use of the multi-module battery pack 16, including construction of the washers 44 from materials of the thermal barrier 55 or coating of the washers 44 with such materials, adhering a multi-layer strip of the thermal barrier 55 to the battery tray 30, or coating the transverse inner wall 34 with the thermal barrier 55 in a spray coating application. By placing the thermal barrier 55 under the module tabs 42, for instance, the thermal barrier 55 is positioned to slow thermal propagation between adjacent battery modules 16M. This in turn may facilitate service and isolation of the underlying faults. These and other benefits will be appreciated by those skilled in the art in view of the foregoing teachings.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A multi-module battery pack comprising:
a battery tray defining multiple battery tray compartments and having a battery tray floor, wherein the battery tray is configured as a grid formed by longitudinal outer walls extending along a length of the battery tray and intersected by equally-spaced transverse inner walls;
a plurality of battery modules, wherein each respective one of the battery modules is disposed within a corresponding one of the battery tray compartments and supported from below by the battery tray floor; and
a thermal barrier attached to a respective upper surface of the transverse inner walls and arranged in a predefined heat transfer path that exists through the battery tray between an adjacent pair of the battery modules, the thermal barrier having a thickness of at least about 1 mm and a thermal conductivity of less than about 4 W/m-K, wherein the thermal barrier is configured to block the heat transfer path and thereby mitigate a thermal runaway event of one of the adjacent pair of the battery modules,
wherein each respective battery module of the plurality of battery modules includes a set of module tabs connected via fasteners to a respective one of the transverse inner walls, and the predefined heat transfer path passes through the module tabs and the fasteners connected thereto.

2. The multi-module battery pack of claim 1, wherein the transverse inner walls are arranged orthogonally with respect to longitudinal outer walls to define the multiple battery tray compartments.

3. The multi-module battery pack of claim 1, wherein each one of the fasteners respectively includes an annular washer disposed on one of the transverse inner walls, wherein the thermal barrier is arranged between the annular washer and the transverse inner walls.

4. The multi-module battery pack of claim 3, wherein the thermal barrier coats the annular washer or is integrally formed therewith.

5. The multi-module battery pack of claim 3, wherein the thermal barrier is configured as an elongated strip that is attached to the transverse inner walls in proximity to the annular washer.

6. The multi-module battery pack of claim 5, wherein the elongated strip defines notches configured to receive a threaded fastener therein.

7. The multi-module battery pack of claim 1, wherein the thermal barrier includes a refractory ceramic material having a thermal conductivity of less than about 4 W/m-K.

8. The multi-module battery pack of claim 1, wherein the battery tray is constructed from aluminum.

9. The multi-module battery pack of claim 1, wherein the thermal barrier includes a heat-absorbing/phase transition layer that is adhered to the battery pack, a heat-reflecting layer that is adhered to the heat-absorbing/phase transition layer, and a thermally-insulating layer that is adhered to the heat-absorbing/phase transition layer.

10. The multi-module battery pack of claim 1, wherein the thermal barrier is a composite thermal spray coating applied to one or more surfaces of the battery tray.

11. A method for mitigating a thermal runaway event in a battery pack having a plurality of battery modules, the method comprising:
providing a battery tray having a battery tray floor configured to support the battery modules from below, wherein the battery tray is configured as a grid formed by longitudinal outer walls extending along a length of the battery tray and intersected by equally-spaced transverse inner walls, wherein the battery tray defines multiple battery tray compartments, each of the battery tray compartments being configured to receive therein and support thereon a respective one of the battery modules;
identifying a heat transfer path through the battery tray between an adjacent pair of battery modules;
arranging the plurality of battery modules on the battery tray;
fastening the plurality of battery modules to the battery tray to thereby construct the battery pack, including connecting the plurality of battery modules to a respective one of the transverse inner walls via a set of module tabs and fasteners; and
arranging a thermal barrier on a respective upper surface of the transverse inner walls in the heat transfer path between the adjacent pair of the battery modules, the thermal barrier having a thickness of at least about 1 mm and a thermal conductivity of less than about 4 W/m-K, such that the thermal barrier blocks the heat transfer path, wherein the heat transfer path passes through the module tabs and the fasteners connected thereto.

12. The method of claim 11, further comprising:
coating or integrally forming an annular washer with the thermal barrier, wherein fastening the plurality of battery modules to the battery tray includes positioning the annular washer in the heat transfer path.

13. The method of claim 11, wherein arranging the thermal barrier in the heat transfer path includes applying refractory ceramics to a surface of the battery tray, the refractory ceramics having a thermal conductivity of less than about 4 W/m-K and a thickness of at least about 1 mm.

14. The method of claim 11, wherein arranging the thermal barrier in the heat transfer path includes spraying the thermal barrier directly onto an external surface of the battery tray.

15. The method of claim 11, further comprising:
forming the thermal barrier as a multi-layered strip, including forming each of a heat-absorbing/phase transition layer that is adhered to the battery tray, a heat-reflecting layer that is adhered to the heat-absorbing/phase transition layer, and a thermally-insulating layer that is adhered to the heat-absorbing/phase transition layer; and
attaching the multi-layered strip to an external surface of the battery tray.

16. An electric powertrain system comprising:
a rotary electric machine having phase leads and an output member;
a driven load coupled to the output member of the rotary electric machine and powered thereby;
a multi-module battery pack having:
a battery tray having a battery tray floor and configured as a grid formed by longitudinal outer walls extending along a length of the battery tray and intersected by equally-spaced transverse inner walls;
a plurality of battery modules each arranged in a respective battery tray compartment of the battery tray and supported from below by the battery tray floor, such that a heat transfer path exists between an adjacent pair of the battery modules through the battery tray, wherein each respective battery module of the plurality of battery modules includes a set of module tabs connected via fasteners to a respective one of the transverse inner walls; and a thermal barrier attached to a respective upper surface of the transverse inner walls of the battery tray, arranged in a predetermined heat transfer path through the battery tray, and having a thermal conductivity of less than about 4 W/m-K, such that the thermal barrier is configured to block the heat transfer path during a thermal runaway event of one of the adjacent pair of battery modules and thereby mitigate the thermal runaway event, wherein the predefined heat transfer path passes through the module tabs and the fasteners connected thereto; and a power inverter module connected to the multi-module battery pack and to the phase leads of the rotary electric machine, wherein the power inverter module is configured to energize the rotary electric machine via the multi-module battery pack to thereby deliver motor torque to the driven load.

17. The electric powertrain system of claim 16, further comprising:
   a plurality of washers coated by or integrally formed from the thermal barrier; and
   a plurality of threaded fasteners each engaged or integrally formed with a respective one of the washers, and configured to secure the plurality of battery modules to the battery tray, wherein the threaded fasteners are configured to secure the plurality of battery modules to the battery tray along the transverse inner walls.

18. The electric powertrain system of claim 16, wherein the thermal barrier is configured as an elongated strip that is attached to the transverse inner walls in proximity to the annular washer.

19. The electric powertrain system of claim 18, wherein the elongated strip defines notches each configured to receive a respective one of the fasteners therein.

20. The electric powertrain system of claim 16, wherein the battery tray is constructed from aluminum.

* * * * *